US011765648B2

(12) United States Patent
Hou et al.

(10) Patent No.: US 11,765,648 B2
(45) Date of Patent: Sep. 19, 2023

(54) ACCESS TYPE SELECTION METHOD AND DEVICE AND STORAGE MEDIUM

(71) Applicant: DATANG MOBILE COMMUNICATIONS EQUIPMENT CO., LTD., Beijing (CN)

(72) Inventors: Yunjing Hou, Beijing (CN); Ming Ai, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 19 days.

(21) Appl. No.: 17/055,604

(22) PCT Filed: Mar. 28, 2019

(86) PCT No.: PCT/CN2019/080142
§ 371 (c)(1),
(2) Date: Nov. 16, 2020

(87) PCT Pub. No.: WO2019/218780
PCT Pub. Date: Nov. 21, 2019

(65) Prior Publication Data

US 2021/0227454 A1 Jul. 22, 2021

(30) Foreign Application Priority Data

May 18, 2018 (CN) ......................... 201810483358.2
May 30, 2018 (CN) ......................... 201810542777.9

(51) Int. Cl.
*H04W 48/18* (2009.01)
*H04W 8/12* (2009.01)
(Continued)

(52) U.S. Cl.
CPC ............ *H04W 48/18* (2013.01); *H04W 8/12* (2013.01); *H04W 48/04* (2013.01); *H04W 48/16* (2013.01); *H04W 60/04* (2013.01); *H04W 64/00* (2013.01)

(58) Field of Classification Search
CPC ........ H04W 48/18; H04W 8/12; H04W 48/04
(Continued)

(56) References Cited

U.S. PATENT DOCUMENTS 6,606,501 B1 8/2003 Saha et al.
7,035,636 B1 4/2006 Lim et al.
(Continued)

FOREIGN PATENT DOCUMENTS

CN 1642345 A 7/2005
CN 101572719 A 11/2009
(Continued)

OTHER PUBLICATIONS

3GPP TS 23.502 V1.4.0, 3rd Generation Partnership Project;Technical Specification Group Services and System Aspects;Procedures for the 5G System; Stage 2 (Release 15), total 263 pages, Dec. 2017.
(Continued)

*Primary Examiner* — Chuck Huynh
(74) *Attorney, Agent, or Firm* — KILPATRICK TOWNSEND & STOCKTON, LLP

(57) ABSTRACT

The present application relates to the field of communications. Disclosed are an access type selection method and device and a storage medium, for solving the problem in the prior art that the location service for a UE cannot be implemented under an access of a 3GPP access type and a non-3GPP access type when AMFs servicing the UE are different. The method comprises: a gateway mobile location center (GMLC) receives a second request sent from a
(Continued)

NG-RAN
AMF/LMF
UDM
GMLC
LCS client
1. LCS service request
2. Nudm_UEContextManagement_Get UE Context management request (UE identity)
3. Nudm_UEContextManagement_Get UE Context management response (AMF address, LMF address, Access type)
4. Provide Location Request (carrying access type)
5. Positioning process in 3GPP access
N3IWF
6. Positioning process in non-3GPP access
7. Provide Location Response (carrying UE location)
8. LCS service reply (UE location)

location service (LCS) client; and the GMLC determines an access type for transmitting location information.

8 Claims, 6 Drawing Sheets

(51) Int. Cl.
*H04W 48/04* (2009.01)
*H04W 48/16* (2009.01)
*H04W 60/04* (2009.01)
*H04W 64/00* (2009.01)

(58) Field of Classification Search
USPC .......................................................... 370/329
See application file for complete search history.

(56) References Cited

U.S. PATENT DOCUMENTS

2007/0004429 A1* 1/2007 Edge ....................... H04W 8/08 455/456.1
2017/0366955 A1 12/2017 Edge
2018/0098279 A1 4/2018 Edge

FOREIGN PATENT DOCUMENTS

CN 101772020 A 7/2010
CN 102076085 A 5/2011
CN 102088771 A 6/2011

OTHER PUBLICATIONS

Qualcomm Incorporated,“Location Services Alternatives for 5G System Architecture and 5G Procedures”, SA WG2 Meeting #119, Feb. 13-17, 2017, Dubrovnik, Croatia, total 28 pages,S2-170819.
Qualcomm Incorporated, “Addition of an LMF Based Location Solution”, SA WG2 Meeting #126, Feb. 26-Mar. 2, 2018, Montreal, Canada, total 20 pages,S2-182300.
CATT,“UDM based Positioning Access selection for LCS service”, SA WG2 Meeting #127-bis, May 28-Jun. 1, 2018, Newport Beach, USA, total 3 pages,S2-185275.
Lenovo et al., “Solution for supporting LCS via non-3GPP access”, SA WG2 Meeting #127, Apr. 16-20, 2018, Sanya, P.R. China, total 5 pages, S2-183808.
3GPP TS 23.271 V14.4.0, 3rd Generation Partnership Project;Technical Specification Group Services and System Aspects;Functional stage 2 description of Location Services (LCS) (Release 14), total 183 pages, Mar. 2018.

* cited by examiner

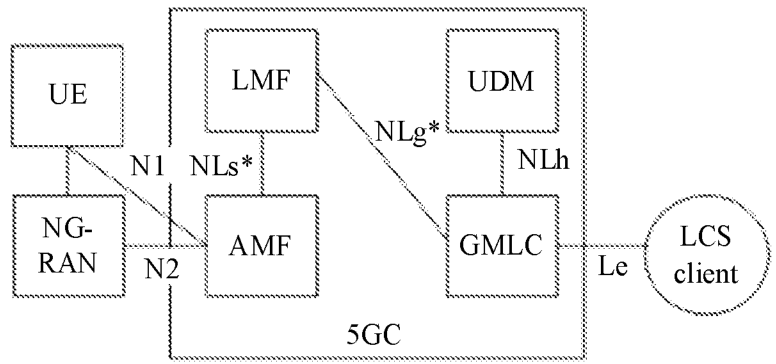

Fig. 6b

If the UDM determines that the AMFs serving the UE are the same for different access types — S303

↓

The UDM sends the access type and the address of a second AMF to the GMLC, where the second AMF is the AMF serving the UE under the access type — S304

Fig. 7

A GMLC receives a second request sent by an LCS client — S801

↓

The GMLC determines the access type for transmitting the positioning information — S802

Fig. 8

The GMLC acquires the second information including at least one of: all access types used by the UE, the AMF serving the UE, and the status information of the UE in each access type — S8021
The GMLC determines the access type for transmitting the positioning information from all the access types according to the second information — S8022
Fig. 9
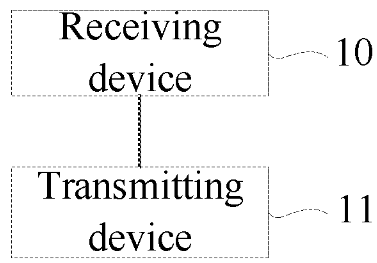
Fig. 10
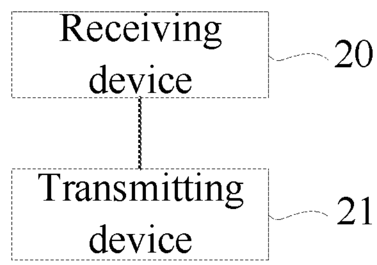
Fig. 11

ACCESS TYPE SELECTION METHOD AND DEVICE AND STORAGE MEDIUM

The present application is a National Stage of International Application No. PCT/CN2019/080142, filed on Mar. 28, 2019, which claims the priorities from Chinese Patent Application No. 201810483358.2 filed with the Chinese Patent Office on May 18, 2018 and entitled "Access Type Selection Method and Device and Storage Medium" and Chinese Patent Application No. 201810542777.9 filed with the Chinese Patent Office on May 30, 2018 and entitled "Access Type Selection Method and Device and Storage Medium", which are hereby incorporated by reference in their entirety.

FIELD OF DISCLOSURE

The present application relates to the field of communication technologies, and particularly to an access type selection method and device and a storage medium.

BACKGROUND

In the 5G (5-Generation) system, a UE (User Equipment) may access the core network through 3GPP (3rd Generation Partnership Project) access type, or may access the core network through non-3GPP (such as Wireless Local Area Network (WLAN)) access type.

When the UE needs to be positioned and the UE accesses the core network through the 3GPP access type and the non-3GPP access type at the same time, how to select the access type to transmit the UE positioning information is a problem to be solved.

BRIEF SUMMARY

The embodiments of the present application provide an access type selection method and device and a storage medium, to select an access type to transmit the UE positioning information.

To this end, in a first aspect, an embodiment of the present application provides an access type selection method, including:

receiving, by a Unified Data Manager (UDM), a first request sent by a Gateway Mobile Location Centre (GMLC); determining, by the UDM, an access type for transmitting positioning information, and sending the access type to the GMLC.

In one embodiment, the sending the access type to the GMLC, includes: sending, by the UDM, an address of a first Access and Mobility Management Function (AMF) to the GMLC if the UDM determines that AMFs serving the UE are different for different access types, where the first AMF is an AMF serving the UE under the access type.

In one embodiment, the sending the access type to the GMLC, includes: sending, by the UDM, the access type and an address of a second AMF to the GMLC if the UDM determines that AMFs serving the UE are same for different access types, where the second AMF is an AMF serving the UE under the access type, and the address of the second AMF is used by the GMLC to send the access type to the second AMF.

In one embodiment, the determining, by the UDM, an access type for transmitting positioning information, specifically includes: acquiring first information, and the first information includes at least one of: all access types used by the UE, an AMF serving the UE, or status information of the UE in each access type; and determining, by the UDM, an access type for transmitting positioning information from all the access types according to the first information.

In one embodiment, after the UDM determines the access type for transmitting the positioning information, the method further includes: sending, by the UDM, an address of a Location Management Function (LMF) to the GMLC, and the address of the LMF is used by the GMLC to send the access type to the LMF.

In a second aspect, an embodiment of the present application provides an access type selection method, including: receiving, by a GMLC, a second request sent by a Location Service (LCS) client; and determining, by the GMLC, an access type for transmitting positioning information.

In one embodiment, the determining, by the GMLC, an access type for transmitting positioning information, includes: acquiring, by the GMLC, second information, and the second information includes at least one of: all access types used by the UE, an AMF serving the UE, or status information of the UE in each access type; and determining, by the GMLC, an access type for transmitting positioning information from all the access types according to the second information.

In one embodiment, the acquiring, by the GMLC, second information, includes: sending, by the GMLC, a third request to a UDM, and receiving, by the GMLC, second information sent by the UDM; or sending, by the GMLC, a fourth request to the AMF serving the UE, and receiving, by the GMLC, second information sent by the AMF serving the UE.

In one embodiment, after the determining by the GMLC, the access type for transmitting the positioning information, the method includes: if the GMLC determines that AMFs serving the UE are same for different access types, sending, by the GMLC, the determined access type and a request to transmit the positioning information to the AMF serving the UE; and receiving, by the GMLC, UE location information sent by the AMF.

In one embodiment, when the UE is roaming, the receiving by the GMLC, the second request sent by the LCS client includes: receiving by a HOME-GMLC(H-GMLC), the second request sent by the LCS client; and determining, by the GMLC, an access type for transmitting positioning information, includes: acquiring, by the H-GMLC, third information, and the third information includes at least one of: all access types used by the UE, an AMF serving the UE, or status information of the UE in each access type; sending, by the H-GMLC, the third information to a Visited-GMLC (V-GMLC), and determining, by the V-GMLC, an access type for transmitting positioning information from all the access types according to the third information.

In one embodiment, after the determining by the V-GMLC, the access type for transmitting the positioning information, the method includes: sending the access type to the AMF serving the UE; or sending the access type to a Location Management Function (LMF).

In a third aspect, an embodiment of the present application provides an access type selection method, including: receiving, by an LMF, a third request sent by a GMLC; and determining, by the LMF, an access type for transmitting positioning information.

In one embodiment, the third request carries fourth information, and the fourth information includes at least one of: all access types used by the UE, an Access and Mobility Management Function, AMF, serving the UE, or status information of the UE in each access type; and the determining, by the LMF, an access type for transmitting positioning information, includes: determining, by the LMF, an access type for transmitting positioning information from all the access types according to the fourth information.

In one embodiment, after the determining by the LMF the access type for transmitting the positioning information, the method includes: sending, by the LMF, the determined access type to the AMF serving the UE.

In a fourth aspect, an embodiment of the present application provides a UDM device for selecting an access type, including: a receiving device configured to receive a first request sent by a GMLC; and a transmitting device configured to determine an access type for transmitting positioning information and send the access type to the GMLC.

In one embodiment, the transmitting device is configured to: send an address of a first AMF to the GMLC if it is determined that AMFs serving the UE are different for different access types, where the first AMF is an AMF serving the UE under the access type.

In one embodiment, the transmitting device is further configured to: send the access type and an address of a second AMF to the GMLC if it is determined that AMFs serving the UE are same for different access types, where the second AMF is an AMF serving the UE under the access type, and the address of the second AMF is used by the GMLC to send the access type to the second AMF.

In one embodiment, the transmitting device is further configured to: acquire first information, and the first information includes at least one of: all access types used by the UE, an AMF serving the UE, or status information of the UE in each access type; and determine the access type for transmitting the positioning information from all the access types according to the first information.

In one embodiment, the transmitting device is further configured to: send an address of an LMF to the GMLC, and the address of the LMF is used by the GMLC to send the access type to the LMF.

In a fifth aspect, an embodiment of the present application provides a GMLC device for selecting an access type, including: a receiving device configured to receive a second request sent by a LCS client; and a determining device configured to determine an access type for transmitting positioning information.

In one embodiment, the determining device is further configured to: acquire second information, and the second information includes at least one of: all access types used by the UE, an AMF serving the UE, or status information of the UE in each access type; and determine the access type for transmitting the positioning information from all the access types according to the second information.

In one embodiment, the determining device is further configured to: send a third request to a UDM, and receive the second information sent by the UDM; or send a fourth request to the AMF serving the UE, and receive the second information sent by the AMF serving the UE.

In one embodiment, the determining device is further configured to: if it is determined that AMFs serving the UE are same for different access types, send the determined access type and a request for transmitting the positioning information to the AMF serving the UE;

receive UE location information sent by the AMF.

In a sixth aspect, an embodiment of the present application provides an LMF device for selecting an access type, including: a receiving device configured to receive a third request sent by a GMLC; and a determining device configured to determine an access type for transmitting positioning information.

In one embodiment, the third request carries fourth information, and the fourth information includes at least one of: all access types used by the UE, an Access and Mobility Management Function, AMF, serving the UE, or status information of the UE in each access type; and the determining device is further configured to: determine the access type for transmitting the positioning information from all the access types according to the fourth information.

In one embodiment, the determining device is further configured to: send the determined access type to the AMF serving the UE.

In a seventh aspect, an embodiment of the present application provides a device for selecting an access type, including at least one processor and at least one memory, and the memory stores a program that causes the processor to perform the steps of the method described in the first or second or third aspect when being executed by the processor.

In an eighth aspect, an embodiment of the present application provides a storage medium storing the computer instructions which cause a computer to perform the steps of the method described in the first or second or third aspect when running on the computer.

BRIEF DESCRIPTION OF THE DRAWINGS

In order to illustrate the embodiments of the present application or in the prior art more clearly, the accompanying figures which need to be used in describing the embodiments will be introduced below briefly. The accompanying figures described below are only some embodiments of the present application.

Figure 12:
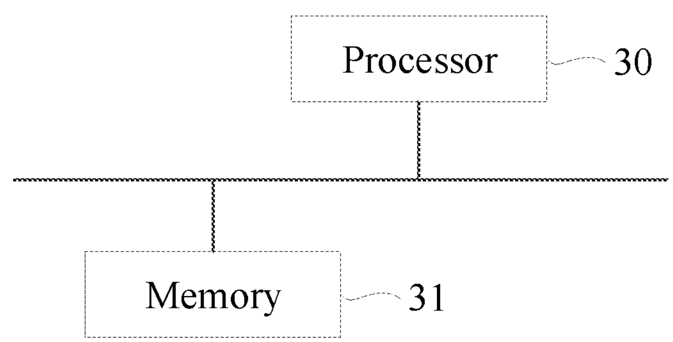

FIG. *6a* is a structural schematic diagram of a positioning architecture provided by embodiments of the present application;

FIG. *6b* is a structural schematic diagram of another positioning architecture provided by embodiments of the present application;

FIG. 7 is a second flow chart of sending by the UDM, the determined access type to the GMLC provided by an embodiment of the present application;

FIG. 8 is a flow chart of a third access type selection method provided by an embodiment of the present application;

FIG. 9 is a flow chart of determining by the GMLC, the access type for transmitting the positioning information provided by an embodiment of the present application;

FIG. 10 is a schematic diagram of a UDM device for selecting an access type provided by an embodiment of the present application;

FIG. 11 is a schematic diagram of a GMLC device for selecting an access type provided by an embodiment of the present application;

FIG. 12 is a schematic diagram of a device for selecting an access type provided by an embodiment of the present application.

DETAILED DESCRIPTION OF THE EMBODIMENTS

The embodiments of the present application will be described clearly and completely below in combination with the accompanying drawings. The described embodiments are a part of the embodiments of the present application but not all the embodiments. Based upon the embodiments recorded in the present application document.

In the prior art, in the scenario where the UE accesses the core network through the 3GPP access type and the non-3GPP access type at the same time, when the network receives a request for positioning service for the UE, the access type is selected mainly through the AMF (Access and Mobility Management Function) or LMF (Location Management Function).

Figure 1:
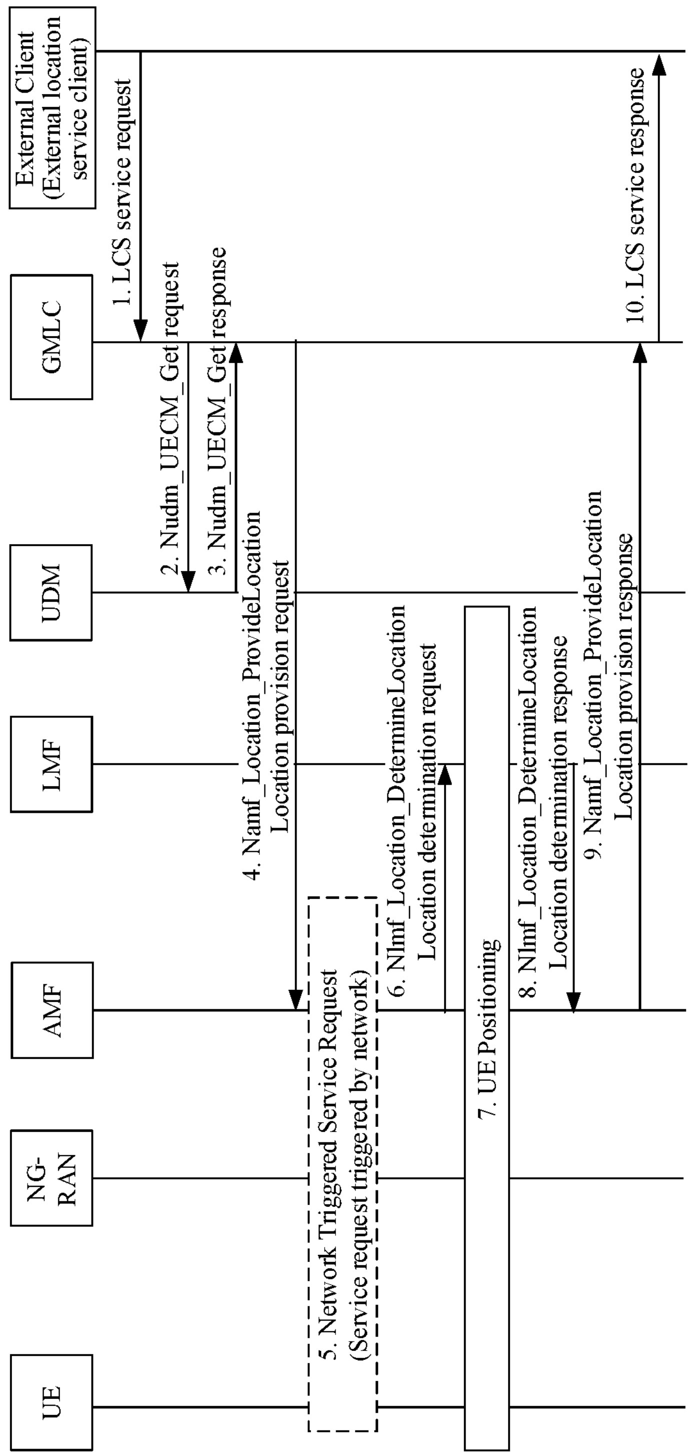
FIG. 1 is a flow chart of the prior art.

For example, as shown in FIG. 1, the process of selecting the access type through the AMF in the prior art includes: an external location service client sends a request to a GMLC (Gateway Mobile Location Centre), where the request carries the target UE identifier; the GMLC calls the Nudm_UECM_Get service operation from the home UDM (Unified Data Manager) of the target UE; the UDM returns the network address of the current serving AMF; the GMLC calls the Namf_Location_ProvideLocation service operation from the AMF to request the current location of the UE; if the UE is in the CM-IDLE state, the AMF initiates the service request process triggered by the network to establish a signaling connection with the UE; the AMF selects the LMF (Location Management Function) according to the NRF request or configuration information, and calls the Nlmf_Location_DetermineLocation service operation from the LMF to request the current location of the UE; and the LMF performs the positioning process, for example, the UE-assisted positioning process, the network-assisted positioning process or the like in the prior art. The LMF returns the Nlmf_Location_DetermineLocation Response to the AMF to return the current location of the UE, where the current location of the UE may include the location estimation information, time, accuracy and other information; the AMF returns the Namf_Location_ProvideLocation_Response to the GMLC/LRF to return the current location of the UE; and the GMLC returns the location service reply to the external location service client.

However, in practical applications, the inventors of the present application found that the AMFs serving the UE may be same or different when the UE accesses the core network through the 3GPP access type and the non-3GPP access type at the same time, while the prior art is only applicable to the scenarios where the AMFs serving the UE are same. But in the scenarios where the AMFs serving the UE are different, the prior art cannot realize the positioning service for the UE. For this reason, the embodiments of the present application proposes an access type selection method to solve the technical problem in the prior art that the positioning service for the UE cannot be realized when the AMFs serving the UE are different under the 3GPP access type and the non-3GPP access type.

The embodiments of the present application will be further described in detail below in combination with the accompanying drawings of the specification.

Figure 2:
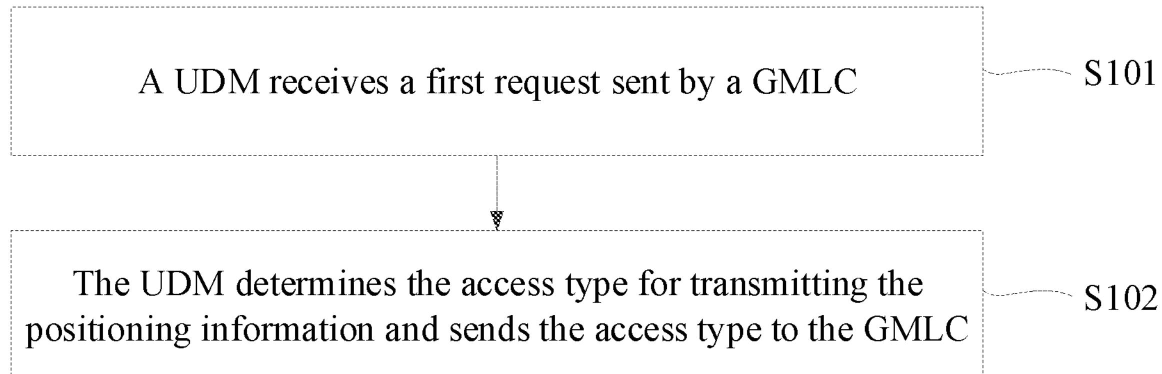
FIG. 2 is a flow chart of a first access type selection method provided by an embodiment of the present application.

In the first embodiment, as shown in FIG. 2, an access type selection method of an embodiment of the present application includes the following steps.

Step S101: a UDM receives a first request sent by a GMLC.

Step S102: the UDM determines the access type for transmitting the positioning information and sends the access type to the GMLC.

Figure 3:
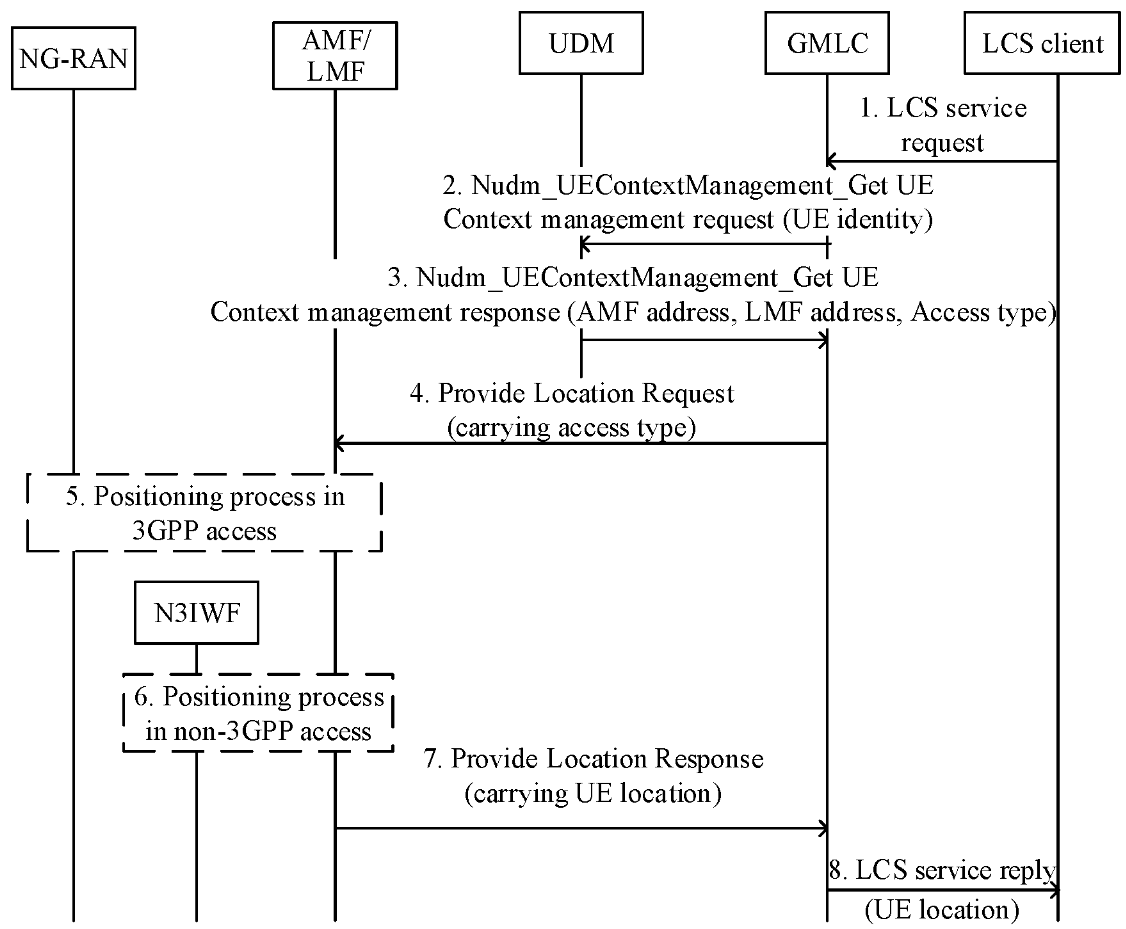
FIG. 3 is a flow chart of a second access type selection method provided by an embodiment of the present application.

The access type selection method in the embodiments of the present application can be applied to the application scenario where the UE is connected to the core network through the 3GPP access type and the non-3GPP access type at the same time. In this application scenario, when an LCS (Location Service) client needs to obtain the location information of the UE, as shown in FIG. 3, the LCS client (i.e., LCS Client in FIG. 3) can send an LCS service request to the GMLC, where the LCS service request carries the identifier of the UE, which may be specifically the GPSI (Generic Public Subscription Identifier) of the UE or the SUPI (Subscription Permanent Identifier) of the UE. In practical applications, the LCS service request may specifically be an LCS Service Request message carrying the identifier of the UE.

After receiving the LCS service request sent by the LCS client, the GMLC sends the first request to the UDM, where the first request includes the identifier of the UE. In practical applications, as shown in FIG. 3, the first request is specifically the Nudm_UEContextManagement_Get Request message carrying the identifier of the UE. After the UDM obtains the first request, the UDM determines the access type for transmitting the positioning information, and sends the determined access type to the GMLC through the Nudm_UEContextManagement_Get Response message.

Figure 4:
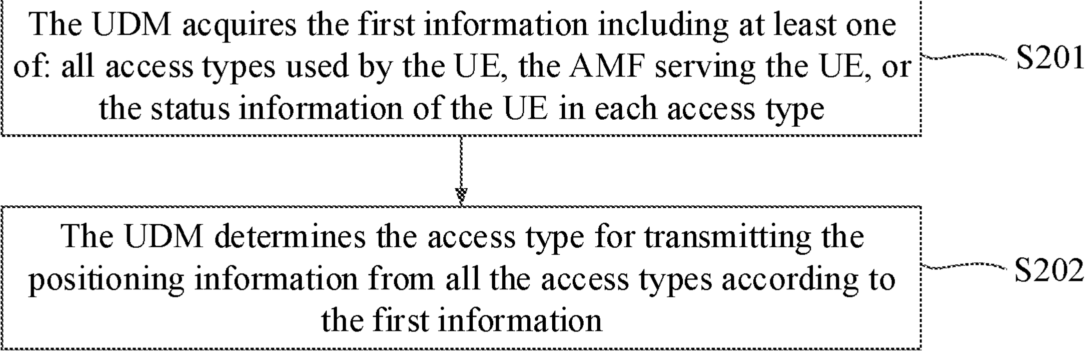
FIG. 4 is a flow chart of determining by the UDM, the access type for transmitting the positioning information provided by an embodiment of the present application.

In practical applications, the above step S102 in which the UDM determines the access type for transmitting the positioning information may be specifically implemented through the process as shown in FIG. 4.

The process shown in FIG. 4 includes:

Step S201: the UDM acquires the first information including at least one of: all access types used by the UE, the AMF serving the UE, and the status information of the UE in each access type.

Step S202: the UDM determines the access type for transmitting the positioning information from all the access types according to the first information.

In an embodiment of the present application, after obtaining the first request, the UDM can obtain the first information related to the UE according to the UE identification information carried in the first request, where the first information may be all access types used by the UE, or may be the AMF serving the UE, or may be the status information of the UE in each access type, etc., and of course, it may also be multiple types of information listed above at the same time. The process in which the UDM obtains the first information related to the UE according to the UE identification information carried in the first request will be described below.

In a specific practice process, when the UE registers through the 3GPP access type or the non-3GPP access type, the UE will send a registration request to the AMF through the access network. During the UE registration process, the AMF registers the UE information with the UDM, and at this time, the information provided by the AMF to the UDM includes the UE's identity, the AMF identity and the access type.

If the serving AMF registered by the UE through the 3GPP access type is different from the serving AMF registered by the UE through the non-3GPP access type, for the convenience of description, the serving AMF registered by the UE through the 3GPP access type is called AMF1, and the serving AMF registered by the UE through the non-3GPP access type is called AMF2, so the information stored in the UDM may be: "UE identity, <3GPP access, AMF1 information>, <non-3GPP access, AMF2 information>", and the AMF1 information may be the IP address or FQDN (Fully Qualified Domain Name) of the AMF1, and the AMF2 information may be the IP address or FQDN of the AMF2.

If the serving AMF registered by the UE through the 3GPP access type is the same as the serving AMF registered by the UE through the non-3GPP access type, for the convenience of description, it is assumed that the AMF is AMF3, so the information stored in the UDM may be: "UE identity, <3GPP access, AMF3 Information>, <non-3GPP access, AMF3 information>", or the information stored in the UDM may be: "UE identity, AMF3 information, 3GPP access, non-3GPP access".

Therefore, the UDM can obtain the first information from the locally stored information, for example, obtain all the access types (i.e., 3GPP access type and non-3GPP access type) used by the UE from the locally stored information, and can further obtain the AMF serving the UE when the UE registers through the 3GPP access type and the AMF serving the UE when the UE registers through the non-3GPP access type from the locally stored information. Therefore, according to the above-mentioned information obtained, it is further judged whether the AMF serving the UE when the UE registers through the 3GPP access type is the same as that when the UE registers through the non-3GPP access type.

For example, according to the above information obtained, the UDM judges that the AMFs serving the UE are different when the UE registers through the 3GPP access type and through the non-3GPP access type. It is assumed here that the AMF serving the UE is AMF1 when the UE registers through the 3GPP access type and the AMF serving the UE is AMF2 when the UE registers through the non-3GPP access type. Then, the UDM can send a Namf_EventExposure message to the AMF1 to obtain the status information of the UE in the 3GPP access type, where the status information may include the registration state change (registered state or de-registered state), connected state change (idle state or connected state), UE reachability state, etc. of the UE in the 3GPP access type.

Similarly, the UDM can send a Namf_EventExposure message to the AMF2 to obtain the status information of the UE in the non-3GPP access type, where the status information may include the registration state change (registered state or de-registered state), connected state change (idle state or connected state), UE reachability state, etc. of the UE in the non-3GPP access type.

For example, according to the above information obtained, the UDM judges that the AMFs serving the UE are the same when the UE registers through the 3GPP access type and through the non-3GPP access type. It is assumed here that the same AMF is AMF3. Then, the UDM can send a Namf_EventExposure message to the AMF3 to obtain the status information of the UE in the 3GPP access type and the status information of the UE in the non-3GPP access type.

After obtaining all the access types used by the UE, the AMF serving the UE, and the status information of the UE in each access type in the above-mentioned way, the UDM can determine the access type for transmitting the positioning information from all the access types (i.e., 3GPP access type and non-3GPP access type) according to the above information obtained. In practical applications, the UDM can also determine the access type for transmitting the positioning information in combination with the above information and the operator's strategy.

For example, when the AMF serving the UE is AMF1 under the 3GPP access type and the AMF serving the UE is AMF2 under the non-3GPP access type, if the UE is in the idle state (i.e., CM-IDLE state) under the 3GPP access type and in the connected state (i.e., CM-CONNECTED state) under the non-3GPP access type, the UDM can determine that the non-3GPP access type is used to transmit the positioning information. If the UE is in the CM-CONNECTED state under the 3GPP access type and in the CM-IDLE state under the non-3GPP access type, the UDM can determine that the 3GPP access type is used to transmit the positioning information.

In an embodiment of the present application, the positioning information may be the location of the UE, such as geographic location, city location (such as the street and city where the UE is located), etc., or may be the time information of obtaining the location of the UE, or may be the positioning-related information such as the positioning method and positioning accuracy used to obtain the location of the UE, or may be messages related to the execution of the positioning process, such as the network positioning message sent by the AMF to the RAN node or N3IWF, and the network positioning message returned by the RAN node or N3IWF to the AMF. Of course, the positioning information may also be other information, which is not listed here and is not limited either.

For example, if the operator's policy includes: if the UE is in the CM-CONNECTED state under both the 3GPP access type and non-3GPP access type, the 3GPP access type is preferentially used to transmit the positioning information. Then, when the UDM determines that the UE is in the CM-CONNECTED state under both the 3GPP access type and the non-3GPP access type, the UDM can determine that the 3GPP access type is used to transmit the positioning information regardless of whether the AMFs serving the UE are the same under the 3GPP access type and under the non-3GPP access type.

In an embodiment of the present application, the UDM may send the determined access type to the GMLC after determining the access type for transmitting the positioning information through the process shown in FIG. 4. In an embodiment of the present application, there are multiple ways to send the determined access type to the GMLC. The multiple ways to send the determined access type to the GMLC will be introduced below.

Figure 5:
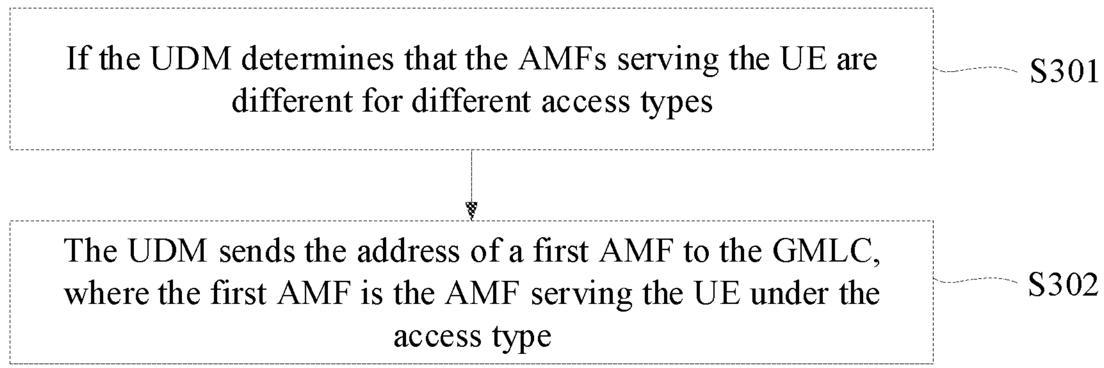
FIG. 5 is a first flow chart of sending by the UDM, the determined access type to the GMLC provided by an embodiment of the present application.

As shown in FIG. 5, the first way to send the determined access type to the GMLC includes:

Step S301: if the UDM determines that the AMFs serving the UE are different for different access types, performing step 302;

Step S302: the UDM sends the address of a first AMF to the GMLC, where the first AMF is the AMF serving the UE under the access type.

Figure 6A:
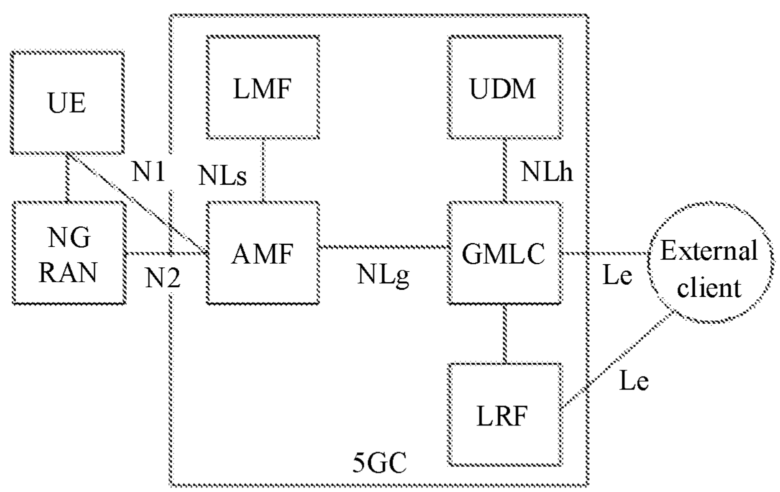

When the UDM determines that the AMFs serving the UE are different for different access types, for example, the AMF serving the UE is AMF1 under the 3GPP access type, and the AMF serving the UE is AMF2 under the non-3GPP access type, if the UDM determines that the access type for transmitting the positioning information is the 3GPP access type, then the UDM can send the address of the AMF1 to the GMLC. In practical applications, the UDM can send the address of the AMF1 to the GMLC through the Nudm_UE- ContextManagement_Get Response message. In practical applications, the positioning architecture of 3GPP access type is as shown in FIG. 6*a*, that is, there is an interface between the GMLC and the AMF. Then, after receiving the address of the AMF1 sent by the UDM, the GMLC can send the request information to provide the UE location to the AMF1 according to the address of the AMF1, where the request information may specifically be a Provide Location Request message. Then, after receiving the Provide Location Request message sent by the GMLC, the AMF1 will perform the positioning process under the 3GPP access type on the UE to obtain the UE location information, and the AMF can feedback the obtained UE location information to the GMLC through the Provide Location Response message. After receiving this message, the GMLC feeds back the UE location information in this message to the LCS client.

If the UDM determines that the access type for transmitting the positioning information is the non-3GPP access type, the UDM can send the address of the AMF2 to the GMLC, and then the GMLC sends the request information to provide the UE location to the AMF2. Then, after receiving the request information to provide the UE location (such as Provide Location Request message) sent by the GMLC, the AMF2 will perform the positioning process in the non-3GPP access type on the UE to obtain the UE location information, and the AMF2 can feedback the obtained UE location information to the GMLC through the Provide Location Response message. After receiving this message, the GMLC feeds back the UE location information in this message to the LCS client.

Therefore, in the above method, the UDM receives the first request (such as Nudm_UEContextManagement_Get Request) sent by the GMLC, and the UDM determines the access type for transmitting the positioning information and sends the access type to the GMLC, to solve the problem in the prior art that the positioning service for the UE cannot be realized when the AMFs serving the UE are different under the 3GPP access type and the non-3GPP access type, and achieve the purpose of realizing the positioning service for the UE when the AMFs serving the UE are different under the 3GPP access type and the non-3GPP access type.

In an embodiment of the present application, the first way to send the determined access type to the GMLC shown in FIG. 5 may further include: the UDM sends the address of the LMF to the GMLC.

For example, if the UDM determines that the access type for transmitting the positioning information is the 3GPP access type, the UDM can send the address of the AMF1 and the address of the LMF to the GMLC at the same time. Then the positioning architecture of 3GPP access type is as shown in FIG. 6*b*, that is, there is an interface between the GMLC and the LMF. Then, the GMLC can send a request directly to the LMF after receiving the address of the AMF1 and the address of the LMF, and then the LMF performs the positioning process in the 3GPP access type to obtain the UE positioning information, so that the LMF transmits the UE positioning information to the GMLC, and the GMLC feeds back it to the LCS client. If the UDM determines that the access type for transmitting the positioning information is the non-3GPP access type, the UDM can also send the address of the AMF2 and the address of the LMF to the GMLC at the same time. The subsequent process can refer to the above description, which will not be repeated here.

As shown in FIG. 7, the second way to send the determined access type to the GMLC includes:

Step S303: if the UDM determines that the AMFs serving the UE are the same for different access types, performing step 304;

Step S304: the UDM sends the access type and the address of a second AMF to the GMLC, where the second AMF is the AMF serving the UE under the access type.

When the UDM determines that the AMFs serving the UE are the same for different access types, for example, the AMF serving the UE is AMF3 under the 3GPP access type and non-3GPP access type, if the UDM determines that the access type for transmitting the positioning information is the 3GPP access type, the UDM will send the address of the AMF3 and the 3GPP access type to the GMLC, and similarly, can send the address of the AMF3 and the 3GPP access type to the GMLC through the Nudm_UEContextManagement_Get Response message, so that the GMLC sends the 3GPP access type and the request information to provide the UE location to the AMF3 according to the received address of the AMF3, where the request information to provide the UE location may be a Provide Location Request message. Therefore, the GMLC can carry the 3GPP access type in the Provide Location Request message and send it to the AMF3. After receiving the Provide Location Request message sent by the GMLC, the AMF3 will perform the positioning process under the 3GPP access type on the UE to obtain the UE location information, and the AMF3 can feedback the obtained UE location information to the GMLC through the Provide Location Response message. After receiving this message, the GMLC feeds back the UE location information in this message to the LCS client.

If the UDM determines that the access type for transmitting the positioning information is the non-3GPP access type, the UDM will send the address of the AMF3 and the non-3GPP access type to the GMLC, so that the GMLC sends the non-3GPP access type and the request information to provide the UE location to the AMF3 according to the received address of the AMF3. Similarly, the request information to provide the UE location sent by the GMLC to the AMF3 may be a Provide Location Request message, and the GMLC can carry the non-3GPP access type in the Provide Location Request message and send it to the AMF3. After receiving the non-3GPP access type and the request information to provide the UE location sent by the GMLC, the AMF3 will perform the positioning process under the non-3GPP access type on the UE to obtain the location information of the UE.

In an embodiment of the present application, the second way to send the determined access type to the GMLC shown in FIG. 7 may also include: the UDM sends the address of the LMF to the GMLC.

For example, if the UDM determines that the access type for transmitting the positioning information is the non-3GPP access type, the UDM can send the address of the AMF3, the non-3GPP access type and the address of the LMF to the GMLC at the same time. Then, there is an interface between the GMLC and the LMF in the positioning architecture of non-3GPP access type. Then, the GMLC can send the non-3GPP access type directly to the LMF after receiving the address of the AMF3, the non-3GPP access type and the address of the LMF, and then the LMF performs the positioning process in the non-3GPP access type to obtain the UE positioning information, so that the LMF transmits the UE positioning information to the GMLC, and the GMLC feeds back it to the LCS client.

Therefore, with the above method, the UDM receives the first request (such as Nudm_UEContextManagement_Get Request) sent by the GMLC, and the UDM determines the access type for transmitting the positioning information and feeds back the access type and the AMF address to the GMLC. The GMLC can send the access type to the AMF, so that the AMF can implement the positioning service for the UE by using the positioning process under the determined access type. This is not only applicable to the UE positioning service in the scenario where the AMFs serving the UE are different under different access types, but also applicable to the UE positioning service in the scenario where the AMFs serving the UE are the same under different access types. Therefore, the method effectively solves the problem in the prior art that the positioning service for the UE cannot be realized when the AMFs serving the UE are different under the 3GPP access type and the non-3GPP access type.

In the second embodiment, as shown in FIG. 8, another access type selection method of an embodiment of the present application includes the following steps:

Step S801: a GMLC receives a second request sent by an LCS client;

Step S802: the GMLC determines the access type for transmitting the positioning information.

The access type selection method shown in FIG. 8 in the embodiments of the present application can also be applied to the application scenario where the UE is connected to the core network through the 3GPP access type and the non-3GPP access type at the same time. In this application scenario, when the LCS client needs to obtain the location information of the UE, the LCS client can send an LCS service request to the GMLC, where the LCS service request is the second request in step S801, and carries the identifier of the UE, which may be specifically the GPSI of the UE or the SUPI of the UE. In practical applications, the LCS service request may specifically be an LCS Service Request message carrying the identifier of the UE.

After receiving the LCS service request sent by the LCS client, the GMLC can determine the access type for transmitting the positioning information. Here, step S802 may be implemented through the process as shown in FIG. 9.

The process shown in FIG. 9 includes:

Step S8021: the GMLC acquires the second information including at least one of: all access types used by the UE, the AMF serving the UE, and the status information of the UE in each access type;

Step S8022: The GMLC determines the access type for transmitting the positioning information from all the access types according to the second information.

In an embodiment of the present application, the GMLC may acquire all the access types used by the UE, or may acquire the AMF serving the UE, or may acquire the status information of the UE in each access type. The way in which the GMLC acquires the above information includes at least two following ways.

First Way.

Step A: the GMLC sends a third request to the UDM;

Step B: the GMLC receives the second information sent by UDM, where the second information includes at least one of: all access types used by the UE, the AMF serving the UE, and the status information of the UE in each access type.

In an embodiment of the present application, after the GMLC receives the LCS service request sent by the LCS client, the GMLC may send the third request to the UDM, where the third request includes the identifier of the UE, and the third request is specifically Nudm_UEContextManagement_Get Request. After the UDM receives the third request, the UDM can acquire all the access types used by the UE, the AMF serving the UE, and the status information of the UE in each access type as described in the first embodiment, and send the above information acquired to the GMLC, so that the GMLC obtains all the access types used by the UE, the AMF serving the UE, and the status information of the UE in each access type from the UDM.

According to the above information acquired, that is, all the access types used by the UE, the AMF serving the UE, and the status information of the UE in each access type, the GMLC can determine the access type for transmitting the positioning information from all the access types (i.e., 3GPP access type and non-3GPP access type) used by the UE. In practical applications, the GMLC can also determine the access type for transmitting the positioning information in combination with the above information and the operator's strategy.

Here, the positioning information may be the location of the UE, such as geographic location, city location (such as the street and city where the UE is located), etc., or may be the time information of obtaining the location of the UE, or may be the positioning-related information such as the positioning method and positioning accuracy used to obtain the location of the UE, or may be messages related to the execution of the positioning process, such as the network positioning message sent by the AMF to the RAN node or N3IWF, and the network positioning message returned by the RAN node or N3IWF to the AMF. Of course, the positioning information may also be other information, which is not listed here and is not limited either.

For example, when the AMF serving the UE is AMF1 under the 3GPP access type and the AMF serving the UE is AMF2 under the non-3GPP access type, if the UE is in the idle state (i.e., CM-IDLE state) under the 3GPP access type and in the connected state (i.e., CM-CONNECTED state) under the non-3GPP access type, the GMLC can determine that the non-3GPP access type is used to transmit the positioning information. If the UE is in the CM-CONNECTED state under the 3GPP access type and in the CM-IDLE state under the non-3GPP access type, the GMLC can determine that the 3GPP access type is used to transmit the positioning information.

For example, if the operator's policy includes: if the UE is in the CM-CONNECTED state under both the 3GPP access type and non-3GPP access type, the 3GPP access type is preferentially used to transmit the positioning information. Then, when the GMLC determines that the UE is in the CM-CONNECTED state under both the 3GPP access type and the non-3GPP access type, the GMLC can determine that the 3GPP access type is used to transmit the positioning information regardless of whether the AMFs serving the UE are the same under the 3GPP access type and under the non-3GPP access type.

Second Way.

Step C: the GMLC sends a fourth request to the AMF serving the UE, and the GMLC receives the second information sent by the AMF serving the UE.

The GMLC may also subscribe to the related events from the AMF serving the UE through the UDM, so the GMLC may also send the fourth request to the AMF serving the UE through the UDM to subscribe to the events such as UE status change and UE location change. When a related event occur, the AMF notifies the GMLC of the related event directly or through the UDM, so that the GMLC obtains all the access types used by the UE, the status information of the UE in each access type, the AMF serving the UE and other information. The GMLC may also store the obtained related event locally.

Then, after receiving the LCS service request sent by the LCS client, the GMLC can acquire all the access types used by the UE, the AMF serving the UE, and the status of the UE in each access type from the locally stored information. According to the above information acquired, the GMLC can determine the access type for transmitting the positioning information from all the access types (i.e., 3GPP access type and non-3GPP access type) used by the UE. In practical applications, the GMLC can also determine the access type for transmitting the positioning information in combination with the above information and the operator's strategy, which will not be repeated here.

In an embodiment of the present application, after determining the access type for transmitting the positioning information, the GMLC may further perform the following steps:

Step E: the GMLC determines that the AMFs serving the UE are the same for different access types;

Step F: the GMLC sends the determined access type and a request to transmit the positioning information to the AMF;

Step G: the GMLC receives the UE location information sent by the AMF.

For example, when the GMLC determines to use the 3GPP access type to transmit the positioning information, and the GMLC determines that the AMFs serving the UE are the same for different access types, the GMLC will send the determined access type and a request to transmit the positioning information to the AMF, where the request to transmit the positioning information may be specifically a Provide Location Request message. The GMLC can carry the determined access type in the Provide Location Request message and send it to the AMF. After receiving the Provide Location Request message sent by the GMLC, the AMF will perform the positioning process under the 3GPP access type on the UE to obtain the UE location information, and the AMF can feedback the obtained UE location information to the GMLC through the Provide Location Response message. After receiving this message, the GMLC feeds back the UE location information in this message to the LCS client.

In an embodiment of the present application, the above steps F and G may also be performed in the following way.

The GMLC sends the determined access type and a request to transmit the positioning information to the LMF; and the GMLC receives the UE location information sent by the LMF.

For example, when the GMLC determines to use the 3GPP access type to transmit the positioning information, and the GMLC determines that the AMFs serving the UE are the same for different access types, and there is an interface between the GMLC and the LMF, the GMLC can send the determined access type and the request to transmit the positioning information to the LMF connected to the AMF, so that the LMF performs the positioning process under the 3GPP access type to obtain the UE positioning information after receiving the determined access type and the request to transmit the positioning information sent by the GMLC. The LMF transmits the UE positioning information to the GMLC, and the GMLC feeds back it to the LCS client.

In an embodiment of the present application, when the GMLC determines that the AMFs serving the UE are different for different access types, the GMLC sends a request to transmit the positioning information to the AMF serving the UE under the determined access type, and the GMLC receives the UE location information sent by the AMF serving the UE under the determined access type.

For example, when the GMLC determines that the AMFs serving the UE are different for different access types, for example, the AMF serving the UE is AMF1 under the 3GPP access type, and the AMF serving the UE is AMF2 under the non-3GPP access type, if the GMLC determines that the access type for transmitting the positioning information is the 3GPP access type, then the GMLC can send a request to transmit the positioning information to the AMF1. Then, after receiving the request to transmit the positioning information sent by the GMLC, the AMF1 will perform the positioning process under the 3GPP access type on the UE to obtain the UE location information, and the AMF can feedback the obtained UE location information to the GMLC through the Provide Location Response message. After receiving this message, the GMLC feeds back the UE location information in this message to the LCS client.

Of course, in practical applications, when the GMLC determines that the AMFs serving the UE are different for different access types, the GMLC may also send the request to transmit the positioning information to the LMF connected to the AMF serving the UE under the determined access type, and the GMLC receives the UE location information sent by the LMF.

In an embodiment of the present application, when the UE is roaming, the method shown in FIG. 8 in the embodiment of the present application may also be specifically implemented in accordance with the following process:

Step H: an H-GMLC receives the second request sent by the LCS client;

Step L: the H-GMLC acquires the third information including at least one of: all access types used by the UE, the AMF serving the UE, or the status information of the UE in each access type;

Step M: the H-GMLC sends the third information to a V-GMLC;

Step N: the V-GMLC determines the access type for transmitting the positioning information from all the access types according to the third information.

In a specific practice process, when the UE is roaming, the GMLC can be divided into H-GMLC (Home-GMLC) and V-GMLC (Visited-GMLC), where the H-GMLC is the GMLC located in the UE's home network (such as HPLMN), and the V-GMLC is the GMLC located in the visited network (such as VPLMN) where the UE roams. Then, the LCS client can send an LCS service request to the H-GMLC, where the LCS service request is the second request in step H, and similarly, the LCS service request can carry the identifier of the UE. After receiving the LCS service request, the H-GMLC can obtain the third message (i.e., the second message in the above) in the first or second way described above, which will not be repeated here.

The H-GMLC sends the obtained third message to the V-GMLC, that is, sends all the access types used by the UE, the AMF serving the UE, and the status information of the UE in each access type to the V-GMLC, and the V-GMLC can determine the access type for transmitting the positioning information from all the access types (i.e., 3GPP access type and non-3GPP access type) used by the UE according to the third message. Similarly, in practical applications, the V-GMLC can also determine the access type for transmitting the positioning information in combination with the above information and the operator's strategy, and the above-mentioned third message in the practical applications may be specifically an LCS Service Request message or a Location Request message. Of course, it may also be other messages, which will not be listed here.

After determining the access type for transmitting the positioning information, the V-GMLC may also send the determined access type to the AMF serving the UE, and of course, it may also send a request to transmit the positioning information, where the request to transmit the positioning information may be a Provide Location Request message or Namf_Location_ProvideLocation_Request message or other messages, which will not be listed here. Taking the request to transmit the positioning information being specifically the Provide Location Request message as an example, then the V-GMLC can carry the determined access type in the Provide Location Request message and send it to the AMF serving the UE. After receiving the Provide Location Request message sent by the V-GMLC, the AMF can perform the positioning process in this access type on the UE according to the access type carried in the Provide Location Request message to obtain the UE location information, and the AMF can feedback the obtained UE location information to the V-GMLC through the Provide Location Response message or Namf_Location_ProvideLocation_Response message or other message, so that the V-GMLC returns the LCS Service Response or Location Response or other message carrying the UE location information to the H-GMLC, and feeds back the UE location information in the LCS Service Response or Location Response or other message to the LCS client through the H-GMLC. The description thereof will not be repeated here, and the specific process can refer to the above description.

Of course, in practical applications, when there is an interface between the V-GMLC and the LMF, the V-GMLC can send the determined access type and a request to transmit the positioning information to the LMF, where the request to transmit the positioning information may be specifically a Provide Location Request message. The V-GMLC can carry the determined access type in the Provide Location Request message and send it to the LMF, and the LMF performs the positioning process in this access type on the UE according to the access type carried in the Provide Location Request message to obtain the UE location information. The LMF transmits the UE location information to the V-GMLC, and the V-GMLC feeds back it to the H-GMLC and then feeds back the UE location information to the LCS client through the H-GMLC. The description thereof will not be repeated here, and the specific process can refer to the above description.

Therefore, with the above method, the GMLC determines the access type for transmitting the positioning information after receiving the second request sent by the LCS client. This is not only applicable to the UE positioning service in the scenario where the AMFs serving the UE are different under different access types, but also applicable to the UE positioning service in the scenario where the AMFs serving the UE are the same under different access types. Therefore, the method effectively solves the problem in the prior art that the positioning service for the UE cannot be realized when the AMFs serving the UE are different under the 3GPP access type and the non-3GPP access type.

In the third embodiment, the present application further provides another access type selection method, which includes the following steps:

Step O: an LMF receives a third request sent by a GMLC;

Step P: the LMF determines the access type for transmitting the positioning information.

The access type selection method in the third embodiment of the present application can also be applied to the application scenario where the UE is connected to the core network through the 3GPP access type and the non-3GPP access type at the same time. In this application scenario, when the LCS client needs to obtain the location information of the UE, it can send an LCS service request to the GMLC, where the LCS service request carries the identifier of the UE. In practical applications, the LCS service request may be specifically an LCS Service Request message, and the identifier of the UE is carried in the LCS Service Request message.

After receiving the LCS service request sent by the LCS client, the GMLC can acquire all the access types used by the UE or the AMF serving the UE or the status information of the UE in each access type in the first or second way as described in the second embodiment. For the convenience of description, all the access types used by the UE, the AMF serving the UE, and the status information of the UE in each access type acquired by the GMLC are collectively referred to as fourth information.

The GMLC sends the acquired fourth information to the LMF through the third request. In actual applications, the third request may be a Provide Location Request message, a Nlmf_ProvideLocation_Request message, or other message, which will not be listed here. Taking the third request being specifically the Nlmf_ProvideLocation_Request message as an example, then the LMF can determine the access type for transmitting the positioning information from all the access types according to the fourth information (i.e., all the access types used by the UE, the AMF serving the UE, and the status information of the UE in each access type) carried in the Nlmf_ProvideLocation_Request message after receiving the Nlmf_ProvideLocation_Request message sent by the GMLC. Similarly, in practical applications, the LMF can also determine the access type for transmitting the positioning information in combination with the fourth information and the operator's strategy. The description thereof will not be repeated here.

Similarly, the positioning information may be the location of the UE, such as geographic location, city location (such as the street and city where the UE is located), etc., or may be the time information of obtaining the location of the UE, or may be the positioning-related information such as the positioning method and positioning accuracy used to obtain the location of the UE, or may be messages related to the execution of positioning, such as the network positioning message sent by the AMF to the RAN node or N3IWF, and the network positioning message returned by the RAN node or N3IWF to the AMF. Of course, the positioning information may also be other information, which is not listed here and is not limited either.

After determining the access type for transmitting the positioning information, the LMF can further send the determined access type to the AMF serving the UE, so that the AMF performs the positioning process within this access type. For example, when the LMF determines that the access type for transmitting the positioning information is the non-3GPP access type, the LMF sends the non-3GPP access type to the AMF serving the UE. Of course, the LMF may also send the positioning request information (such as a DL Positioning message or a network Positioning message or other message) to provide the UE location simultaneously. Then, after receiving the non-3GPP access type, the AMF can use the positioning process within the non-3GPP access type to obtain the UE location information, and the AMF feeds back the obtained UE location information to the LMF. Then the LMF feeds back the UE location information to the GMLC through the Provide Location Response message or the Nlmf_ProvideLocation_Response message or other message. After receiving the message carrying the UE location information, the GMLC feeds back the UE location information in the message to the LCS client.

Therefore, with the above method, the LMF determines the access type for transmitting the positioning information after receiving the third request sent by the GMLC. This is not only applicable to the UE positioning service in the scenario where the AMFs serving the UE are different under different access types, but also applicable to the UE positioning service in the scenario where the AMFs serving the UE are the same under different access types. Therefore, the method effectively solves the problem in the prior art that the positioning service for the UE cannot be realized when the AMFs serving the UE are different under the 3GPP access type and the non-3GPP access type.

Based on the same inventive concept, an embodiment of the present application provides a UDM device for selecting an access type. The specific implementations of the method for selecting an access type of the device can refer to the description of the above method embodiments, and the repeated description thereof will be omitted here. As shown in FIG. 10, the device includes:

a receiving device 10 configured to receive a first request sent by a GMLC; and a transmitting device 11 configured to determine an access type for transmitting the positioning information and send the access type to the GMLC.

In one embodiment, the transmitting device is specifically configured to: send an address of a first AMF to the GMLC if it is determined that AMFs serving the UE are different for different access types, where the first AMF is an AMF serving the UE under the access type.

In one embodiment, the transmitting device is further configured to: send the access type and an address of a second AMF to the GMLC if it is determined that AMFs serving the UE are same for different access types, where the second AMF is an AMF serving the UE under the access type, and the address of the second AMF is used by the GMLC to send the access type to the second AMF.

In one embodiment, the transmitting device is further configured to: acquire first information including at least one of: all access types used by the UE, an AMF serving the UE, and status information of the UE in each access type; and determine the access type for transmitting the positioning information from all the access types according to the first information.

In one embodiment, the transmitting device is further configured to: send an address of an LMF to the GMLC, and the address of the LMF is used by the GMLC to send the access type to the LMF.

Based on the same inventive concept, an embodiment of the present application provides a GMLC device for selecting an access type. The specific implementations of the method for selecting an access type of the device can refer to the description of the above method embodiments, and the repeated description thereof will be omitted here. As shown in FIG. 11, the device includes: a receiving device 20 configured to receive a second request sent by a LCS client; and a determining device 21 configured to determine an access type for transmitting the positioning information.

In one embodiment, the determining device is further configured to: acquire second information including at least one of: all access types used by the UE, an AMF serving the UE, and status information of the UE in each access type; and determine the access type for transmitting the positioning information from all the access types according to the second information.

In one embodiment, the determining device is further configured to: send a third request to a UDM, and receive the second information sent by the UDM; or send a fourth request to the AMF serving the UE, and receive the second information sent by the AMF serving the UE.

In one embodiment, the determining device is further configured to: if it is determined that AMFs serving the UE are same for different access types, send the determined access type and a request to transmit the positioning information to the AMF serving the UE; and receive the UE location information sent by the AMF.

Based on the same inventive concept, an embodiment of the present application provides an LMF device for selecting an access type. The specific implementations of the method for selecting an access type of the device can refer to the description of the above method embodiments, and the repeated description thereof will be omitted here. The device includes:

a receiving device configured to receive a third request sent by a GMLC;

a determining device configured to determine an access type for transmitting the positioning information.

In one embodiment, the third request carries fourth information including at least one of: all access types used by the UE, an Access and Mobility Management Function, AMF, serving the UE, or status information of the UE in each access type; and the determining device is further configured to: determine the access type for transmitting the positioning information from all the access types according to the fourth information.

In one embodiment, the determining device is further configured to: send the determined access type to the AMF serving the UE.

Based on the same inventive concept, an embodiment of the present application provides a device for selecting an access type, as shown in FIG. 12, which includes at least one processor 30 and at least one memory 31, and the memory stores a program that causes the processor to perform the steps of the access type selection method as described in the above first or second or third embodiment when being executed by the processor.

Based on the same inventive concept, an embodiment of the present application provides a storage medium storing the computer instructions which cause a computer to perform the steps of the access type selection method as described in the above first or second or third embodiment when running on the computer.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An access type selection method, comprises:

receiving, by a Gateway Mobile Location Centre, GMLC, a second request sent by a Location Service, LCS, client, wherein the second request is a location request used to request location information of a User Equipment, UE;

determining, by the GMLC, an access type for transmitting positioning information for the UE;

wherein the access type is a 3$^{rd}$ Generation Partnership Project, 3GPP access type, or a non-3GPP access type;

wherein the determining, by the GMLC, an access type for transmitting positioning information for the UE, comprises:

acquiring, by the GMLC, second information, the second information comprises: all access types used by the UE, an Access and Mobility Management Function, AMF, serving the UE, and status information of the UE in each access type;

determining, by the GMLC, an access type for transmitting positioning information for the UE from all the access types used by the UE according to the second information.

2. The method of claim 1, wherein the acquiring, by the GMLC, second information, comprises:

sending, by the GMLC, a third request to a Unified Data Manager, UDM, and receiving, by the GMLC, second information sent by the UDM; or sending, by the GMLC, a fourth request to the AMF serving the UE, and receiving, by the GMLC, second information sent by the AMF serving the UE.

3. The method of claim 1, wherein after the determining, by the GMLC, the access type for transmitting the positioning information for the UE, the method comprises:

if the GMLC determines that a same AMF serves the UE for different access types, sending, by the GMLC, a determined access type and a request for transmitting the positioning information to the AMF serving the UE;

receiving, by the GMLC, UE location information sent by the AMF.

4. The method of claim 1, wherein when the UE is roaming, the receiving, by the GMLC the second request sent by the LCS client, comprises: receiving, by a Home-GMLC, H-GMLC, the second request sent by the LCS client;

determining, by the GMLC, an access type for transmitting positioning information for the UE, comprises:

acquiring, by the H-GMLC, third information, wherein the third information comprises at least one of: all access types used by the UE, an AMF serving the UE, or status information of the UE in each access type;

sending, by the H-GMLC, the third information to a Visited-GMLC, V-GMLC, and determining, by the V-GMLC, an access type for transmitting positioning information for the UE from all the access types used by the UE according to the third information.

5. The method of claim 4, wherein after the determining, by the V-GMLC the access type for transmitting the positioning information, the method comprises:

sending the access type to the AMF serving the UE; or sending the access type to a Location Management Function, LMF.

6. A GMLC device, comprises at least one processor and at least one memory, wherein the memory stores a program that causes the processor to perform the method of claim 1 when being executed by the processor.

7. The GMLC device of claim 6, wherein the processor is configured to execute the program to perform followings:

acquiring second information, wherein the second information comprises at least one of: all access types used by the UE, an Access and Mobility Management Function, AMF, serving the UE, or status information of the UE in each access type;

determining the access type for transmitting the positioning information for the UE from all the access types used by the UE according to the second information;

the processor is configured to execute the program to acquire the second information by:

sending a third request to a Unified Data Manager, UDM, and receive the second information sent by the UDM; or sending a fourth request to the AMF serving the UE and receive second information sent by the AMF serving the UE.

8. The GMLC device of claim 6, wherein the processor is configured to execute the program to perform followings:

if it is determined that AMFs serving the UE are same for different access types, sending the determined access type and a request for transmitting the positioning information to the AMF serving the UE;

receiving UE location information sent by the AMF.

* * * * *